United States Patent [19]

Takayama et al.

[11] Patent Number: 4,630,706
[45] Date of Patent: Dec. 23, 1986

[54] VEHICLE BRAKING SYSTEM

[75] Inventors: Toshio Takayama, Kanagawa; Tetsuo Haraikawa, Chiba, both of Japan

[73] Assignee: Tokico Ltd., Kawasaki, Japan

[21] Appl. No.: 683,553

[22] Filed: Dec. 19, 1984

[30] Foreign Application Priority Data

Jan. 28, 1984 [JP] Japan .................................. 59-14063

[51] Int. Cl.⁴ ............................................ B60K 28/00
[52] U.S. Cl. ...................................... 180/273; 60/534; 180/282; 180/290; 303/22 R; 303/114
[58] Field of Search ............... 180/273, 275, 282, 286, 180/290; 60/534; 303/22 R, 114

[56] References Cited

U.S. PATENT DOCUMENTS

| 2,796,154 | 6/1957 | Stelzer | 188/152 |
| 3,357,311 | 12/1967 | Cripes | 91/32 |
| 3,364,818 | 1/1967 | Hager et al. | 91/24 |
| 3,763,975 | 10/1973 | Fontaine | 180/273 |
| 3,777,841 | 12/1973 | Thorner | 180/286 |
| 3,790,223 | 2/1974 | Fontaine | 180/273 |
| 3,795,426 | 3/1974 | Sisson | 91/376 R |
| 4,076,093 | 2/1978 | Mizuno | 180/286 |

FOREIGN PATENT DOCUMENTS

| 1131614 | 11/1965 | United Kingdom . |
| 1162855 | 1/1967 | United Kingdom . |
| 1283438 | 7/1972 | United Kingdom . |
| 1283439 | 7/1972 | United Kingdom . |
| 1374815 | 11/1974 | United Kingdom . |

Primary Examiner—John J. Love
Assistant Examiner—Kenneth R. Rice
Attorney, Agent, or Firm—Wenderoth, Lind & Ponack

[57] ABSTRACT

A vehicle braking system of the type including a pneumatic booster which includes a shell casing, a flexible diaphragm, a power piston connected to the diaphragm to define a constant pressure chamber and a variable pressure chamber in the shell casing, an input shaft, a valve mechanism provided in the power piston and associated with the input shaft to control the pressure in the variable pressure chamber, an output shaft receiving the output force from the power piston, and a reaction mechanism for transmitting reaction force of the output shaft to the input shaft. The booster further includes a control chamber, and a control piston partitioning the interior of the control chamber into a second constant pressure chamber and a second variable pressure chamber. The pressure in the second variable pressure chamber is controlled by a control mechanism in response to a predetermined operational condition of the vehicle, and the control piston is associated with the input shaft such that the control piston applies a force on the input shaft in the brake applying direction when the control piston is displaced.

5 Claims, 12 Drawing Figures

VEHICLE BRAKING SYSTEM

BACKGROUND OF THE INVENTION

This invention relates to a vehicle braking system for use in a vehicle such as an automobile.

A vehicle braking system including a pneumatic booster interposed between a brake pedal and a master cylinder and utilizing vacuum pressure in the intake manifold of an engine of the vehicle for augmenting the force applied on the brake pedal in actuating the master cylinder is known to the public. Typically, the pneumatic booster comprises a shell casing, a flexible diaphragm, a power piston connected to the diaphragm and defining a constant pressure (vacuum) chamber and a variable pressure chamber in the shell casing, an input shaft adapted to be connected to the brake pedal, a valve mechanism provided in the power piston and associated with the input shaft to control the pressure in the variable pressure chamber (to selectively connect or disconnect the variable pressure chamber with the vacuum chamber and atmospheric pressure), an output shaft adapted to be connected to a piston of a master cylinder and receiving the output force from the power piston, and a reaction mechanism for transmitting reaction force to the input shaft.

The reaction force is usually determined by the dimensional relationship between parts in the reaction mechanism, or by the so-called boost ratio of the booster.

While in braking the vehicle, it is preferable to control the deceleration changes in response to the depressing force applied on the brake pedal, however, when, for example, the weight of the vehicle is increased, the deceleration tends to decrease. Therefore, it is preferable to provide a braking system which makes it possible to adjust the output force of the pneumatic booster in response to various operational conditions of the vehicle.

SUMMARY OF THE INVENTION

The present invention has been made in view of the aforesaid circumstance, and the vehicle braking system according to the invention is of the type including a pneumatic booster which includes a shell casing, a flexible diaphragm, a power piston connected to the diaphragm to define a constant pressure chamber and a variable pressure chamber in the shell casing, an input shaft, a valve mechanism provided in the power piston and associated with the input shaft to control the pressure in the variable pressure chamber, an output shaft receiving the output force from the power piston, and a reaction mechanism for transmitting reaction force of the output shaft to the input shaft. The booster according to the invention further comprises a control chamber, and a control piston partitioning the interior of the control chamber into a second constant pressure chamber and a second variable pressure chamber, said control piston being associated with the input shaft such that the control piston applies a force on the input shaft in the brake applying direction when the control piston is displaced by receiving the differential pressure between the two second chambers.

It is possible to change the ratio between the output force and input force or the boost ratio of the booster according to the invention under a predetermined operational condition of the vehicle. Further, it is possible to actuate the booster without operating the brake pedal i.e. it is possible to apply the brakes automatically by operating a manual switch or the like.

BRIEF DESCRIPTION OF THE DRAWINGS

Further objects and effects of the invention will become apparent from the following detailed description taken with reference to the accompanying drawings exemplifying some preferred embodiments of the invention, in which.

DETAILED DESCRIPTION OF THE INVENTION

Figure 1:
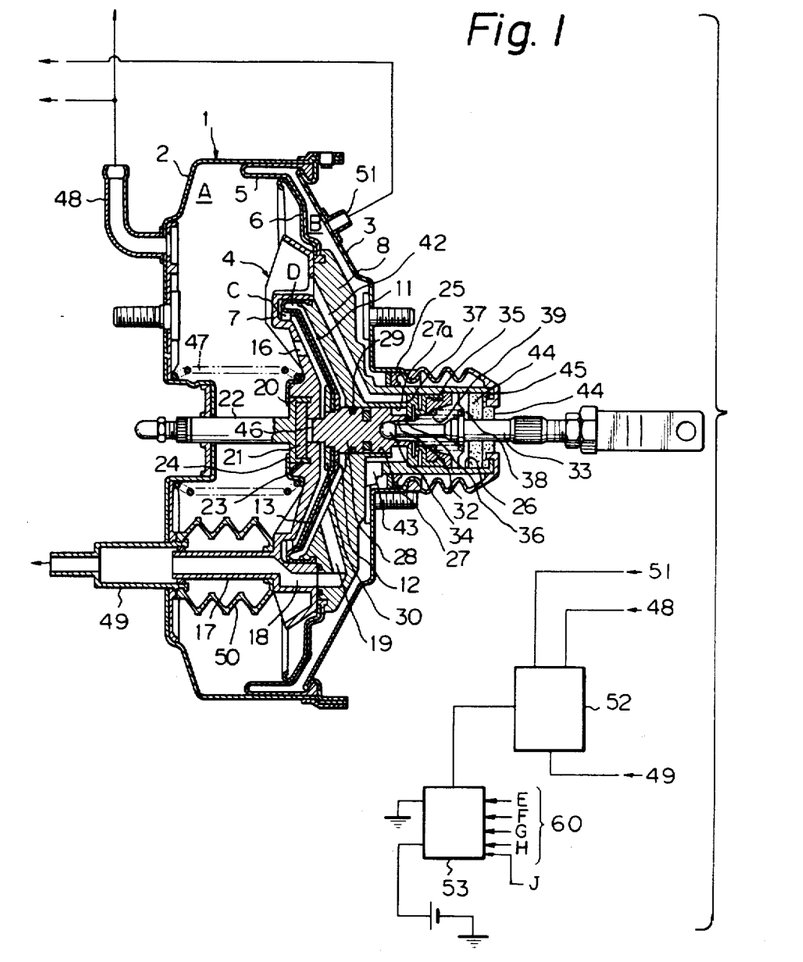
FIG. 1 is a longitudinal sectional view of a vacuum booster according to a first embodiment of the invention with a pipe line and an electric circuit for controlling the booster also being illustrated.

FIG. 1 through FIG. 5 show a first embodiment according to the invention. In FIG. 1, shown at 1 is a main body of a booster for use in a vehicle braking system. The main body 1 consists of a front shell 2 and a rear shell 3. A power piston 4 is displaceably disposed in the main body 1 through a flexible diaphragm 5, and the power piston 4 and the diaphragm 5 partition the interior of the main body 1 into a first constant pressure chamber A on the front side (the left side in the drawing) and a first pressure chamber B on the rear side.

Figures 2, 4:
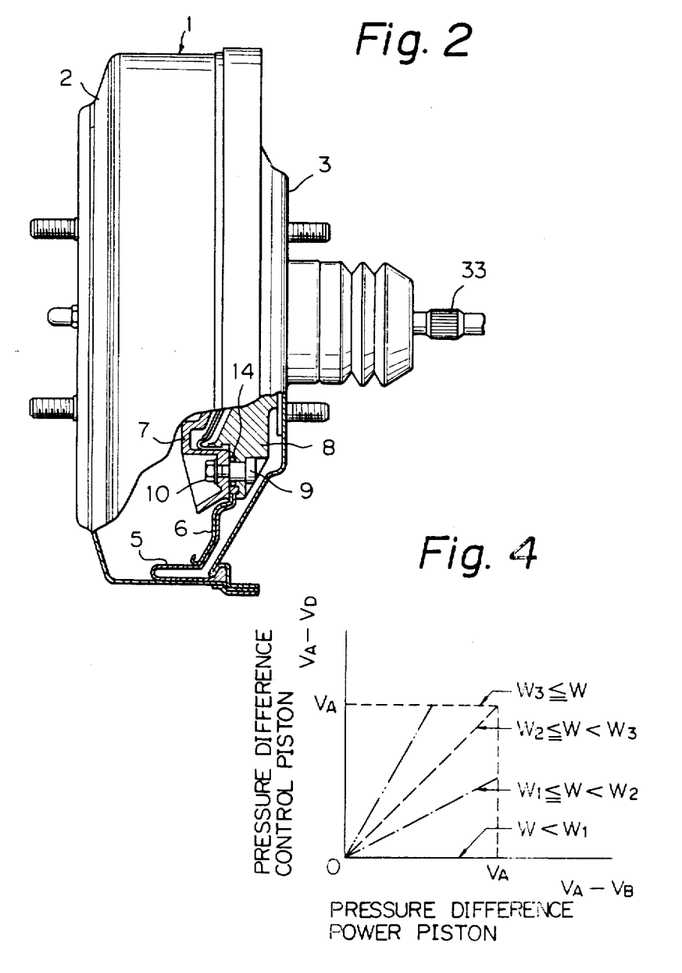
FIG. 2 is a partially broken away side view of the booster of FIG. 1.
FIG. 4 is a diagram showing the relationship between the pressure difference in the power piston and the control piston of the booster of FIG. 1.

The outer circumference of the diaphragm 5 is clamped between the front and rear shells 2 and 3, and the inner circumference thereof is secured to the power piston 4. The power piston 4 consists mainly of a piston plate 6, a piston holder 7 and a valve body 8. The inner circumference of the piston plate 6 is, together with the diaphragm 5, clamped rigidly between the piston holder 7 and the valve body 8. The piston holder 7 and the valve body 8 are secured together by bolts 9 and nuts 10 as shown in FIG. 2, and define therebetween a control chamber 11. A control piston 13 is displaceably disposed in the control chamber through a flexible control diaphragm 12, and the interior of the control chamber 11 is partitioned into a second constant pressure chamber C on the front side and a second pressure chamber D on the rear side by the diaphragm 12 and the control piston 13. Shown at 14 in FIG. 2 is a seal.

One or more openings 16 are formed in the piston holder 7 for permanently communicating the first constant pressure chamber A and the second constant pressure chamber C. A projecting portion 17 is formed on the front side of the piston holder 7, and a passage 18 is formed in the projecting portion 17. The passage 18 is communicated with a passage 19 which is formed in the valve body 8 and is communicated permanently with the second pressure chamber D.

A stepped central bore 20 consisting of a small diameter portion and a large diameter portion is formed in the piston holder 7 and, a reaction disc 21 formed of an elastic material such as rubber and a large diameter flange 23 formed on the rear end of an output shaft 22 are fitted in the large diameter portion of the stepped bore 20. The reaction disc 21 is fitted in a recess 24 formed in the flange 23.

The rear end portion of the valve body 8 slidably extends rearwards through a central opening formed in the rear shell 3. A seal member 25 is disposed between the rear shell 3 and the valve body 8. A stepped central bore consisting of a large diameter valve bore 26 and a small diameter cylinder bore 27 is formed in the valve body 8. A plunger 28 is slidably fitted in the cylinder bore 27 with a seal ring 29 being disposed therebetween. The plunger 28 has a small diameter portion on the forward end which is slidably fitted in the small diameter bore of the stepped bore 20 in the piston holder 7. The forward end portion of the plunger 28 passes through the central portions of the control diaphragm 12 and the control piston 13 and is secured to the control diaphragm 12 and the control piston 13 through a fixing member 30. A recess 32 is formed in the rear end of the plunger 28 to receive a ball end 34 which is formed on the forward end of an input shaft 33. A brake pedal (not shown) is connected to the rear end of the input shaft 33. The reaction disc 21 and the plunger 28 constitute a reaction mechanism for transmitting a reaction force from the output shaft 22 to the input shaft 33.

Coaxial annular valve seats 36 and 36 are respectively formed on the rear ends of the cylinder bore 27 and the plunger 28 respectively. A poppet valve 37 formed of resilient material such as rubber is disposed in the valve bore 26 for cooperating with the valve seats 36 and 36. The annular rear and portion of the poppet valve 37 is secured to the valve bore 26 and radially extending annular forward surface of the poppet valve 37 is biased by a spring 39 against the valve seats 36 and 36. The spring 39 is retained on a spring retainer 38 mounted on the input shaft 33.

A passage 42 is formed in the piston holder 7 and the valve body 8 with one end thereof opening into the first constant pressure chamber A and the other end thereof opening into the valve bore 26 at a location rearwards of the valve seat 35. A passage 43 is formed in the valve body 8 with one end thereof opening into the first pressure chamber B and the other end thereof opening into the cylinder bore 27. Shown at 45 is a silencer and at 44 is an air cleaner.

In the normal inactuated condition of the booster, a predetermined clearance 46 is formed between the rear surface of the reaction disc 21 and the front side surface of the plunger 28. A return spring 47 is disposed between the front shell 2 and the power piston 4 to bias the power piston 4 rearwardly. A connecting port 48 communicating with the first chamber A and a connecting port 49 communicating with the passage 18 are provided in the front shell 2. A contractible and extendable seal member 50 such as bellows seals the port 49 and the passage 18 from the first chamber A. A connecting port 51 is provided in the rear shell 3 to communicate with the pressure chamber B.

Figure 3:
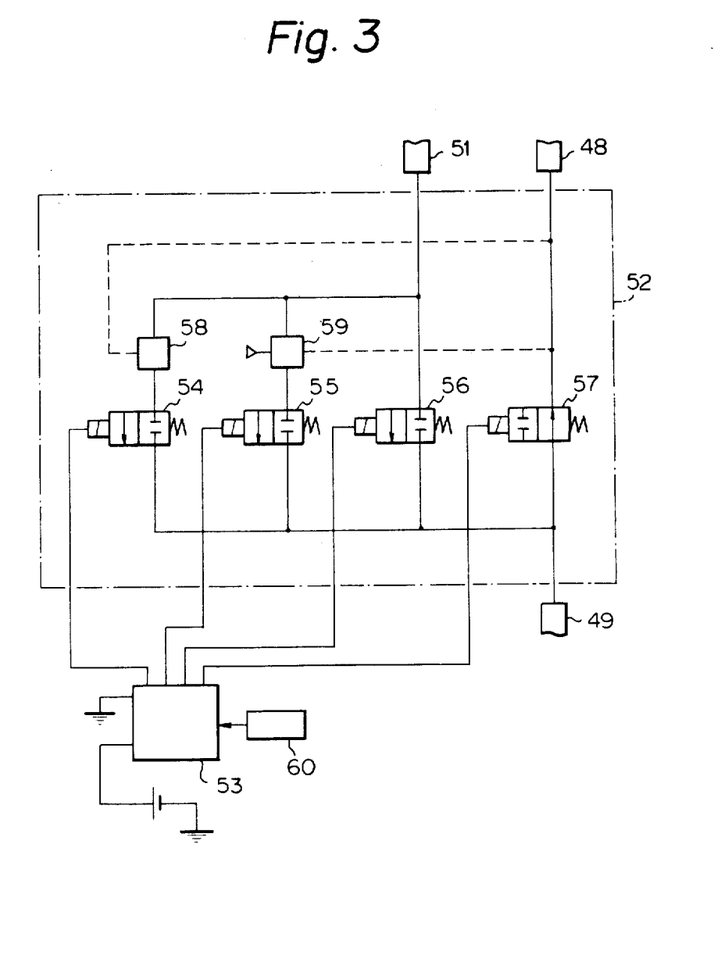
FIG. 3 is a detailed view of the pipe line and circuit of FIG. 1.

The connecting port 48 is connected to a source of vacuum pressure such as an intake manifold of an engine and also to a selector valve 52. The valve 52 is also connected to connecting ports 49 and 51. The selector valve 52 comprises, as shown in FIG. 3, normally closed electromagnetic valves 54, 55 and 56, a normally open electromagnetic valve 57 and constant ratio regulators 58 and 59 respectively connected to electromagnetic valves 54 and 55. These electromagnetic valves 54, 55, 56 and 57 are electrically connected to a controller 53. The electromagnetic valve 57 is connected to connecting ports 48 and 49 and the electromagnetic valve 56 is connected to the connecting ports 51 and 49.

The controller 53 receives signals 60 representing operational conditions of the vehicle such as a vehicle speed signal E, a gas pedal actuating signal F, a manual brake operating signal G, vehicle weight detecting signal H and seat belt fitting signal J and the like, and when predetermined signals 60 are supplied to the controller 53, electromagnetic valves 54, 55, 56 and 57 are switched. Further, there is provided a sensor (not shown) for detecting the actuation of the brake pedal.

The operation of the device will now be explained. In the normal nonactuated condition shown in FIGS. 1 and 3 with the brake pedal not being depressed, the connecting port 49 is communicated through the electromagnetic valve 57 with the connecting port 48 which is permanently connected to a source of vacuum pressure, and thus, the second constant pressure chamber C and the second pressure chamber D are at the vacuum pressure and both chambers are at the same pressure. Therefore, the booster acts as the usual single diaphragm type vacuum booster. Namely, when the brake peadal is depressed, a thrust force is applied on the input shaft 33 and the plunger 28 displaced forward. The valve seat 36 on the plunger 28 separates from the poppet valve 37, and atmospheric air enters into the first pressure chamber B through the opening in the rear end of the valve body 8, the interior of the valve bore portion 26 of the valve body 8, the central opening in the poppet valve 37, the clearance between the poppet valve 37 and the valve seat 36, the interior of the cylinder bore portion 27 in the valve body 8 and radial passage 43 in the valve body 8. The first constant pressure chamber A is at the vacuum pressure. Thus, a pressure difference generated between chambers B and A, and the power piston 4 receives an increased thrust force in the forward direction. The thrust force is transmitted to the output shaft 22 while the reaction force of the output shaft is transmitted to the input shaft 33 through the reaction disc 21 and the plunger 28. The clearance 46 between the plunger 28 and the reaction disc 21 is effective to generate so-called jumping-in characteristics.

Due to the forward displacement of the valve body 8, the clearance between the poppet valve 37 and the valve seat 36 gradually decreases to zero, and the booster reaches to an equilibrium condition. The booster generates an output force which equals the product of the input force and the booster ratio.

When the depressing force on the brake pedal is released, the plunger 28 together with the poppet valve 37 displaced rearwards, the valve seat 35 on the valve body 8 separates from the poppet valve 37, and the first pressure chamber B is communicated with the chamber A. The power piston 4 returns to the original position While, when the weight of the vehicle is changed due to an increase or decrease in the number of passengers or the weight of cargo, it is preferable to change the boost ratio of the booster automatically. In conventional braking apparatus, the driver of the vehicle has been required to change the depression force applied on the brake pedal so as to obtain optimum braking force.

According to the first embodiment of the invention, the control valve 52 is interposed between the first constant pressure chamber A (connecting port 48), the first pressure chamber B (connecting port 51), and the second pressure chamber D (connecting port 49) to change the boost ratio (the ratio between the output force and input force) based on the differential pressure between the chambers B and A and in accordance with signals received from various sensors such as a vehicle weight detecting sensor and the like. The controller 53 shown in FIG. 1 receives vehicle speed signal E (the sensor detecting the speed of the vehicle is not shown), gas pedal actuating signal F, hand brake actuating signal G, vehicle weight signal H, and seat belt fitting signal J. The controller 53 controls the valve 52 as shown in the following Table 1, when the signals E, F, G and J satisfy predetermined conditions.

TABLE 1

|  | $W < W_1$ | $W_1 \leq W < W_2$ | $W_2 \leq W < W_3$ | $W_3 \leq W$ |
|---|---|---|---|---|
| Valve 54 | OFF | ON | OFF | OFF |
| Valve 55 | OFF | OFF | OFF | ON |
| Valve 56 | OFF | OFF | ON | OFF |
| Valve 57 | OFF | ON | ON | ON | wherein
W: weight of vehicle $$W_1 < W_2 < W_3$$

FIG. 3 shows the condition of $W < W_1$, where the booster acts as a single diaphragm type booster.

When $W_1 \leq W < W_2$, the first pressure chamber B and the second pressure chamber D are communicated through the valve 54 and the constant ratio regulator 58. The regulator 58 regulates the pressure in the chambers A, B and D to satisfy the following equation:

$$V_A - V_D = K(V_A - V_B)$$

wherein $0 < K < 1$
$V_A$: vacuum pressure in chamber A
$V_B$: vacuum pressure in chamber B
$V_D$: vacuum pressure in chamber D Therefore, the control piston 13 receives the differential pressure between chambers D and C which has a predetermined relationship relative to the differential pressure between chambers A and B, and thus the input force on the input shaft 33 is augmented.

When $W_2 \leq W < W_3$, the chambers B and D are communicated through the electromagnetic valve 56, and the differential pressure between chambers C and D is equal to that between chambers A and B. Since $K < 1$, the input force is further augmented.

Figure 5:
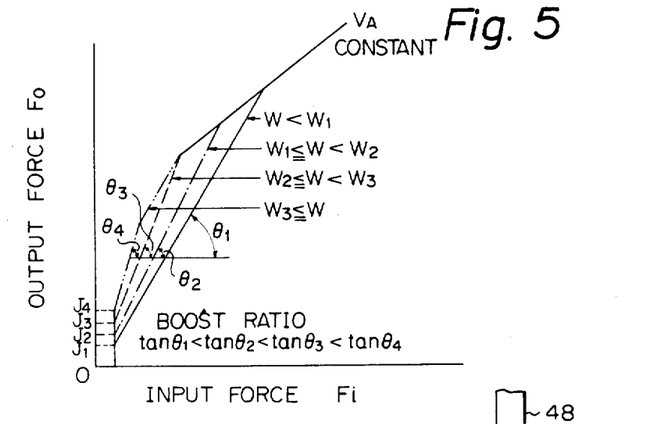
FIG. 5 is a diagram of input/output force characteristics.

When $W_3 \leq W$, the chambers B and D are communicated through the electromagnetic valve 55 and the constant ratio regulator 59. The regulator 59 acts similar to the regulator 58; but has a predetermined ratio $K'$ larger than 1 ($K' > 1$) i.e. the differential pressure between chambers C and D is larger than that between chambers A and B. Therefore, the input force on the input shaft 33 is still further augmented. FIGS. 4 and 5 show the aforesaid conditions. As will clearly be understood from the drawings, it is possible to increase the braking force automatically in response to the increase in the weight of the vehicle. Incidentally, shown at $J_1$, $J_2$, $J_3$ and $J_4$ in FIG. 5 are the output forces in jumping-in conditions.

SECOND EMBODIMENT

In the first embodiment, the jumping-in output force and the boost ratio are automatically controlled in response to the change in the weight of the vehicle, however, the invention is not limited to the specified usage.

Figure 6:
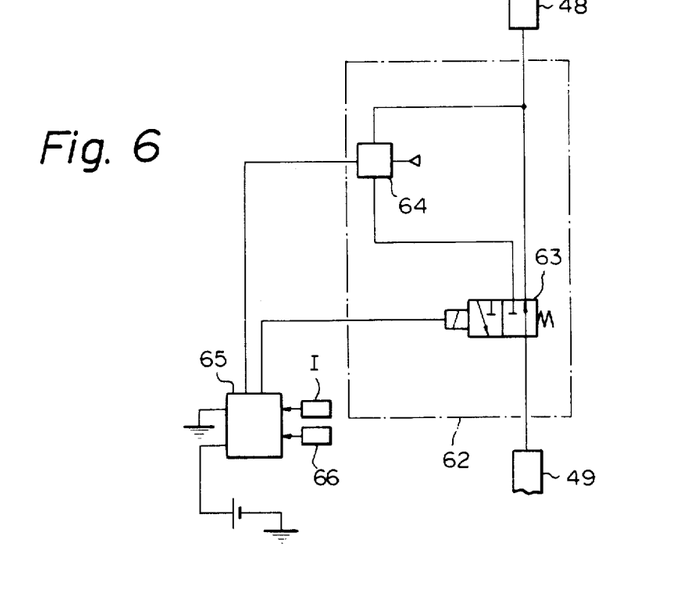
FIG. 6 is a view similar to FIG. 3 but showing a second embodiment.
Figure 7:
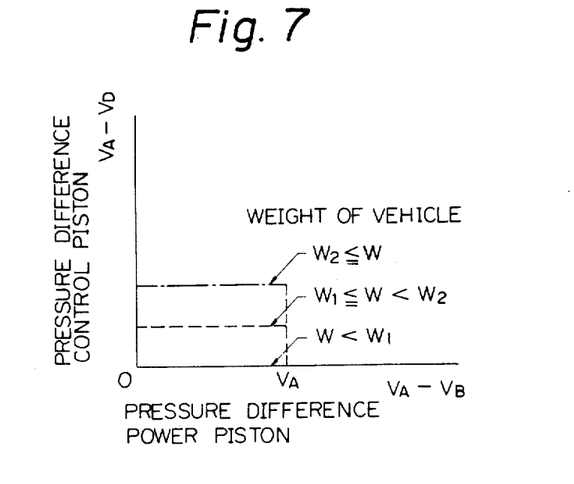
FIGS. 7 and 8 are views similar to FIGS. 4 and 5 respectively but showing the characteristics of the second embodiment.
Figure 8:
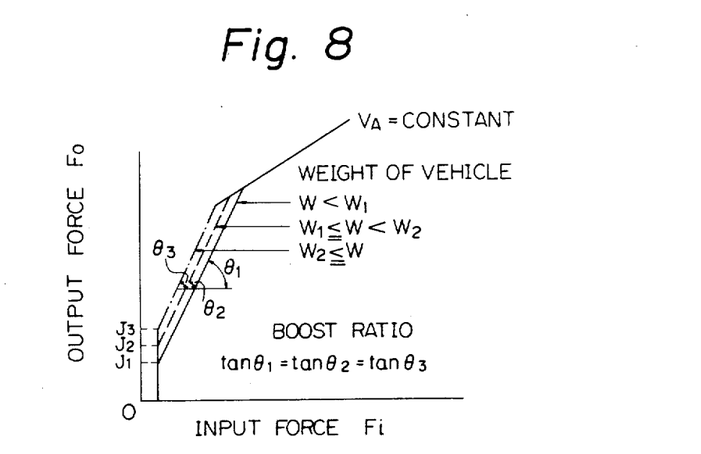

FIGS. 6-8 show a second embodiment, wherein the control valve 52 in the first embodiment is replaced by a control valve 62 consisting of an electromagnetic valve 63 and a constant differential regulator 64. A controller 65 for controlling the valve 62 receives signals similar to signals 60 in the first embodiment and, also signal 66 representing the input force applied to the input shaft or the depressing force on the brake pedal.

The controller 65 controls the valve 66 as follows when normal depressing force is applied on the brake pedal.

|  | $W < W_1$ | $W_1 \leq W < W_2$ | $W_2 \leq W$ |
|---|---|---|---|
| Valve 63 | OFF | ON | ON |
| Setting, Regulator 64 | $l_1$ | $l_1$ | $l_2$ | wherein
$W_1 < W_2$
$l_1 < l_2$

The setting of the regulator 64 in the normal condition or the de-energized condition is $l_1$.

In the condition $W < W_1$, the valve 63 is at the condition shown in FIG. 6, and the chamber D is communicated with the source of vacuum pressure, and the booster acts as a single diaphragm type booster.

When $W_1 \leq W < W_2$, the chamber D is connected to the source of vacuum pressure through the regulator 64 and the valve 63 to establish the following relationship:

$$V_A - V_D = l_1.$$

A predetermined differential pressure is generated between chambers C and D and the control piston 13 augments the input force on the input shaft 33 thereby increasing the output force. The electromagnetic valve 63 is switched when the depressing force signal 66 is supplied to the controller 65 indicating that the booster is actuated. The connection between the pressure chamber B and the control valve 62 is omitted, since the constant differential regulator 64 can introduce atmospheric pressure into the chamber D.

When $W_2 \leq W$, the chamber D is connected to the vacuum chamber A through the regulator 64 and the valve 63 similarly to the condition of $W_1 \leq W < W_2$, however, the setting of the regulator 64 is $$V_A - V_D = l_2 \ (l_2 > l_1).$$

Thus, the input force is further augmented.

FIGS. 7 and 8 show characteristics of the second embodiment. As will be clearly understood from drawings, the boost ratio is maintained constant but the output force in the jumping-in condition changes substantially. In a conventional booster, the clearance 46 between the plunger and the reaction disc has been increased when increasing the output force in the jumping-in condition. However, such counter-measure tends to reduce the durability of the reaction disc. According to the invention, it is possible to determine jumping-in characteristics without reducing the durability of the reaction disc.

The control mechanism shown in FIGS. 3 or 6 may further be modified to control the differential pressure between chambers C and D by supplying signals representing the deceleration of the vehicle being braked into the controller the reference numeral should be 53 or 65.

THIRD EMBODIMENT

Figure 9:
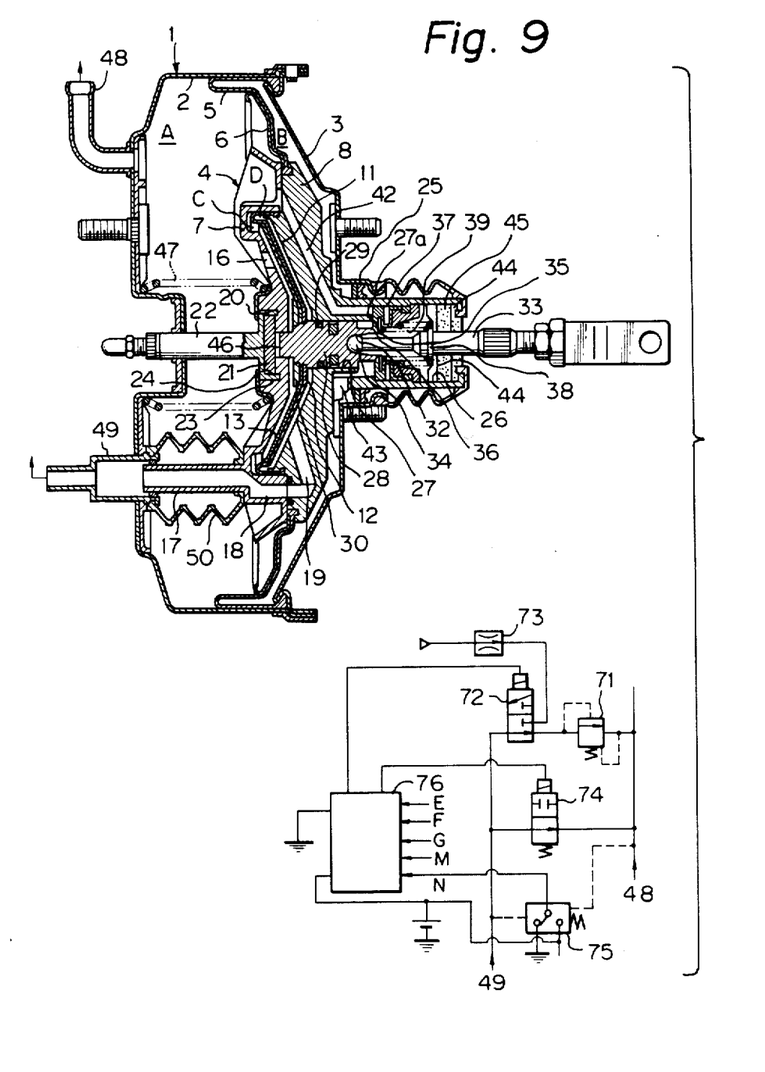
FIG. 9 is a view similar to FIG. 1 but showing a third embodiment of the invention.
Figure 10:
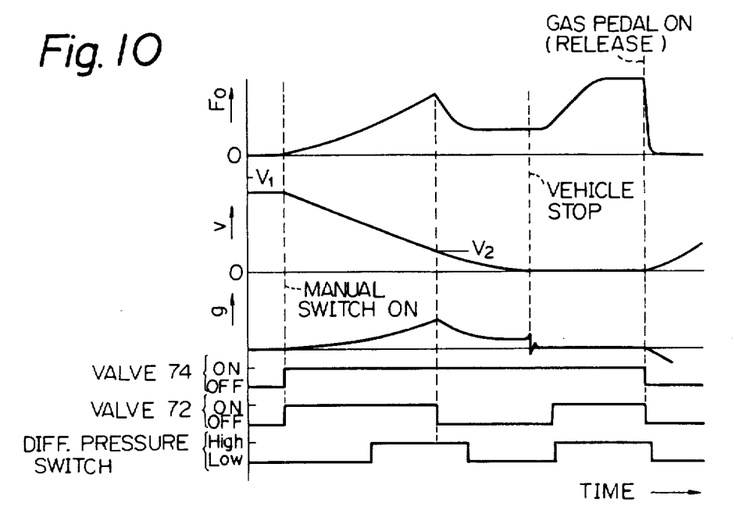
FIGS. 10 and 11 are diagrams showing the change in the braking force, the vehicle speed and the like in brake applying conditions of the third embodiment.
Figure 11:
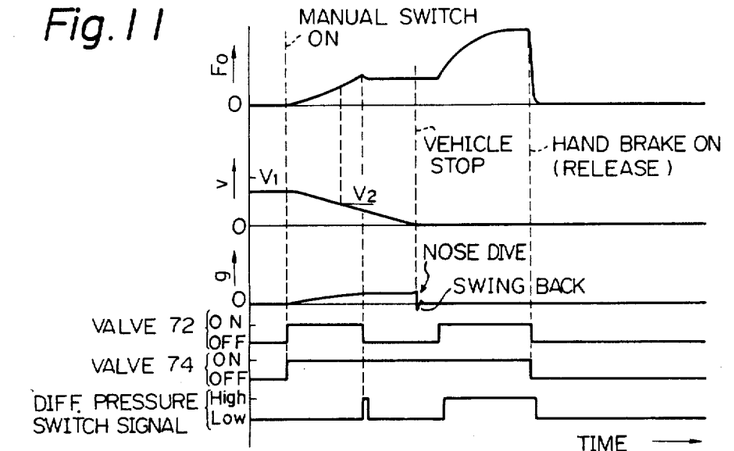

FIGS. 9–11 show a third embodiment of the invention. The booster shown in FIG. 9 is generally similar to the booster of FIG. 1 and corresponding parts are denoted by the same reference numerals and a detailed description, thereof is omitted. The connecting port 51 in FIG. 1 is omitted, and the connecting port 48 which is permanently connected to the source of vacuum pressure is connected to an electromagnetic valve or a selector valve 72 through a constant differential pressure reducing valve 71. The electromagnetic valve is connected through a throttling valve 73 to the atmosphere. Further, the connecting port 48 is connected to another electromagnetic valve (selector valve) 74 and to a differential pressure switch 75. The valves 72 and 74 and the differential pressure switch 75 are connected to the connecting port 49. A controller 76 is electrically connected to valves 72 and 74 and the switch 75. The controller 76 receives signals such as vehicle speed signal E, gas pedal actuating signal F, hand brake actuating signal G, manual switch signal M which indicates the actuation of a manually operable switch (not shown) provided in the driver's compartment of the vehicle, differential switch signal N and the like.

FIG. 9 shows the non-actuated condition, in which the chamber D is connected to the source of vacuum pressure through passages 19 and 18, the connecting port 49 and the valve 74, and thus, no differential pressure is generated between chambers C and D and the booster acts as a single diaphragm type booster.

When the controller 76 receives vehicle speed signal E indicating that the vehicle speed is lower than a predetermined speed $V_1$, gas pedal signal F indicating the OFF condition, hand brake signal G indicating the OFF condition, and the manual switch signal indicating the ON condition, electromagnetic valves 72 and 74 are switched simultaneously so that atmospheric air is introduced into the chamber D through the throttling valve 73, the electromagnetic valve 72 and the connecting port 49. A differential pressure is generated between chambers D and C, and thus, the control piston 13 moves forward, the plunger 28 is carried forward with respect to the valve body 8, the valve seat 36 on the plunger 28 separates from the poppet valve 37, and atmospheric air is introduced into the chamber B through the opening in the rear end of the valve body 8, the central opening in the poppet valve 37, the clearance between the valve seat 36 and the poppet valve 37 and the radial opening 43 in the valve body 8. Thus, a differential pressure is generated between chambers B and A and a forward thrust acts on the power piston 4, and thus, the booster generates an output force. The output force is determined by the equilibrium between the reaction force transmitted to the plunger 28 from the reaction disc 21 and the force caused by the differential pressure between chambers D and C.

When the vehicle is stopped by the aforesaid procedure (operating the manual switch with the gas pedal, the brake pedal and the hand brake being released) the speed V of the vehicle decreases rapidly and the deceleration g of the speed V increases to the maximum at the instant of the stoppage, and thus, the so-called nose-dive phenomenon and the swing-back phenomenon will be observed due to sudden stoppage. In the embodiment of FIG. 9, when the speed V decreases to a predetermined speed $V_2$, the electromagnetic valve 72 is automatically switched so that the pressure in the chamber D is decreased so as to establish a predetermined decreased pressure difference which is determined by the valve 71, and thereafter, when the speed V is decreased to zero, the electromagnetic valve is automatically switched thereby increasing the braking force. FIG. 10 shows the aforesaid process. Namely, by operating the manual switch, valves 72 and 74 are switched, the braking force $F_o$ gradually increases, the vehicle speed V gradually decreases, and the differential pressure between chambers C and D gradually increases. The differential pressure may exceed a predetermined differential pressure set by the switch 75. When the speed V decreases to $V_2$, the valve 72 is switched, and the braking force $F_o$ is decreased to a predetermined level. A small amount of nose-dive phenomenon and swing-back phenomenon are shown in the drawing, but which are substantially decreased as compared with the prior art device.

The differential pressure switch 75 acts to prevent the aforesaid switching of valve 72 from ON to OFF until the differential pressure between chambers C and D exceeds the predetermined pressure set by the switch 75 which is nearly equal to the set pressure on the differential pressure valve 71. FIG. 11 shows the aforesaid process.

The feature that the braking force is automatically applied after the stoppage of the vehicle is advantageous in preventing or relieving a traffic accident due to a rear end collision caused by following vehicles after the stoppage of the subject vehicle.

The braking force can be released by operating the manual switch or depressing the gas pedal. Further, electromagnetic valves 72 and 74 can also be switch to the OFF condition shown in FIG. 9 by applying the hand brake.

According to the embodiment of FIG. 9, the braking force can automatically be applied by operating the manual switch so that the vehicle can stop by a predetermined process.

Figure 12:
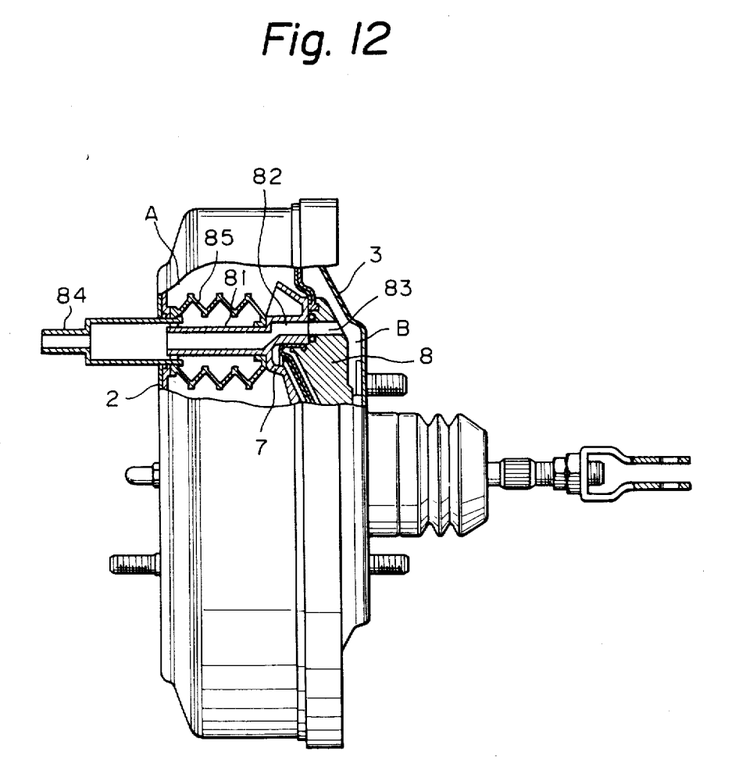
FIG. 12 is a partially broken away side view showing a modified form of the first embodiment.

In the first embodiment, a connecting port 51 is provided in the rear shell 3 to communicate the chamber B with the control valve 52. However, in a modified form shown in FIG. 12, a tubular projecting portion 81 is formed on the piston holder 7 to define a passage 82 therein, a communicating hole 83 is formed in the valve body 8 to communicate the chamber B with the passage 82, a tubular connecting port 84 is integrally provided in the front shell 2 to slidably receive the tubular projecting portion 81, and an extendable and contractible seal member 85 is provided to cover the projecting portion 81 and seal it from the chamber A. By connecting the connecting port 84 with the control valve 52, the embodiment of FIG. 12 operates similar to the first embodiment. The embodiment of FIG. 12 is advantageous in mounting the booster on the vehicle since all connecting ports 48, 49 and 84 are provided on the front shell.

As described hereinbefore, the vehicle braking system according to the invention comprises a pneumatic booster the input/output characteristics of which adjustable under predetermined operating conditions of the vehicle, for example, when the weight of the vehicle is increased the braking force can be increased without increasing the force applied on the brake pedal.

Further, it is possible, by operating a manual switch, to apply the braking force in a predetermined mode without applying the force on the brake pedal.

The booster according to the invention is compact in size and relatively simple in construction.

What is claimed is:

1. A vehicle braking system including a pneumatic booster which includes a shell casing, a flexible diaphragm, a power piston connected to the diaphragm to define a constant pressure chamber and a variable pressure chamber in the shell casing, an input shaft, a valve mechanism provided in the power piston and associated with the input shaft to control the pressure in the variable pressure chamber, an output shaft receiving the output force from the power piston, and a reaction mechanism for the reaction force of the output shaft to the input shaft, wherein the booster further comprises a control chamber, and a control piston partitioning the interior of the control chamber into a second constant pressure chamber and a second variable pressure chamber, said control piston being associated with the input shaft such that the control piston applies a force to the input shaft in the brake applying direction when the control piston is displaced by receiving the differential pressure between two second chambers.

2. A vehicle braking system according to claim 1, wherein the control chamber is formed in the power piston, and a second flexible diaphragm is provided which cooperates with the control piston to partition the interior of the control chamber.

3. A vehicle braking system according to claim 1, wherein a control device is provided to control the pressure in the second variable pressure chamber.

4. A vehicle braking system according to claim 3, wherein a manually operable switch is provided to control the control device.

5. A vehicle braking system according to claim 3, wherein the control device comprises means for receiving signals representing the operating condition of the vehicle such as a vehicle speed signal, a gas pedal actuating signal, a hand brake operating signal, a vehicle weight signal, and a seat belt fitting signal.

* * * * *